US005079124A

United States Patent [19]

Kawata et al.

[11] Patent Number: 5,079,124

[45] Date of Patent: Jan. 7, 1992

[54] CARRIER FOR DEVELOPER

[75] Inventors: Hideaki Kawata, Neyagawa; Masatomi Funato, Osaka; Nobuaki Kawano, Hirakata; Koji Honda, Higashiosaka, all of Japan

[73] Assignee: Mita Industrial Co., Ltd., Osaka, Japan

[21] Appl. No.: 544,672

[22] Filed: Jun. 27, 1990

[30] Foreign Application Priority Data

Jun. 29, 1989 [JP] Japan .................................. 1-165345

[51] Int. Cl.$^5$ ........................... G03G 9/00; B32B 9/00

[52] U.S. Cl. .................................... 430/108; 430/904; 428/405

[58] Field of Search ................. 430/108, 904; 428/405

[56] References Cited

U.S. PATENT DOCUMENTS 3,996,392 12/1976 Berg et al. ........................... 430/108
4,384,070 5/1983 Gaske et al. .................... 524/609 X

*Primary Examiner*—Marion E. McCamish
*Assistant Examiner*—Stephen C. Crossan
*Attorney, Agent, or Firm*—Wenderoth, Lind & Ponack

[57] ABSTRACT

A resin-coated magnetic carrier for two-component developers which comprises magnetic particles and a resin coating formed on the individual magentic particles is described. The resin coating is made of a cured resin composition comprised of an alkylated melamine resin whose moelcular weight satisfies the followin inequality $$M \geqq 1100C-400$$

wherein M represents a weight average molecular weight of the resin and C represents the number of carbon atoms in the alkyl moiety, and an acryl-modified silicone resin. The use of the composition is effective in preventing the coated particles from melt adhesion and in forming a smooth and uniform coating layer on individual particles. The resin-coated carrier is significantly reduced in amount of spend carrier and has good durability, moisture resistance, chargeability.

8 Claims, 3 Drawing Sheets

CARRIER FOR DEVELOPER

FIELD OF THE INVENTION

This invention relates to a carrier for developer and more particularly, to an improvement in a resin-coated magnetic carrier for use in two-component developers.

BACKGROUND OF THE INVENTION

In the commercial fields of reprography, an electrostatic image has been widely developed by a magnetic brush development using two-component magnetic developers. The two-component magnetic developers widely used are those which are made of mixtures of magnetic carriers consisting of iron powder or sintered ferrite particles and toner particles made of dispersions of ingredients, such as colorants, charge controlling agents and the like, in fixing resins.

When the two-component magnetic developer has been employed over a long term, the magnetic carrier is gradually covered with the resin of the toner particles on the surfaces thereof, presenting the so-called "spent" problem. In the developer, the magnetic carrier is generally low in electric resistance. In order to obtain an image of high quality, there is a demand for a combination of a high resistance carrier and a low resistance toner.

To solve these problems, magnetic carriers coated with a resin on the surface thereof have been proposed and have now been in use. A number of proposals have been made on the type of resin coating. For instance, Japanese Patent Publication No. 58-9946 proposes the resin coating for carrier which is made of a combination of from 5 to 30 wt % of a melamine resin and the balance of an epoxy resin, an acrylic resin or an alkyd resin. Moreover, in Japanese Laid-open Patent Application No. 62-262057, there is described the coating of the carrier surface with a resin obtained by curing reaction between a thermoplastic resin having unreacted hydroxyl groups and alkoxylated melamine resin.

The resin coating of carrier particles should meet two requirements which stand opposite each other, i.e. strong adhesion of the resin to the surface of the carrier particles, and no mutual adhesion of resin-coated carrier particles.

The resin coating containing a melamine resin or an alkylated melamine resin is advantageous in that when a carrier and a toner are mixed, the coating causes the carrier to be charged positively and, correspondingly, the toner to be negatively charged, coupled with another advantage that the resin may act as a curing agent for other reactive resins.

However, where the conventional alkylated melamine resin-containing coating is applied onto the carrier surface, the resin coating layers are fusedly combined together thereby causing the carrier particles to be bonded. If the bonded particles are broken into pieces, the carrier surface inevitably becomes irregular owing to the breakage of the resin coating layer. This makes sit difficult to form a uniform resin coating layer on the carrier surface. In addition, deposition of the toner on the irregular portions will produce a spent phenomenon, causing the life of the carrier to be shortened.

SUMMARY OF THE INVENTION

A object of the invention is to provide a resin-coated magnetic carrier wherein carrier particles are not fusedly bonded together by melt adhesion of the resin coating layers and whose resin coating layer is smooth and uniform without irregularity formed on the surface thereof.

Another object of the invention is to provide a resin-coated magnetic carrier for two-component developers which is rarely spent and has good durability, moisture resistance and chargeability in combination.

According to the invention, there is provided a resin-coated magnetic carrier for two-component developer which comprises magnetic particles and a resin coating formed on the surface of each particle, the resin coating being made of a cured resin composition which comprises an alkylated melamine resin having a molecular weight satisfying the following inequality (1):

$$M \geqq 1100C - 400 \quad (1)$$

[wherein M represents a weight average molecular weight of the resin and C represents the number of carbon atoms in the alkyl moiety] and an acryl-modified silicone resin.

DETAILED DESCRIPTION AND EMBODIMENTS OF THE INVENTION

Figure 1:
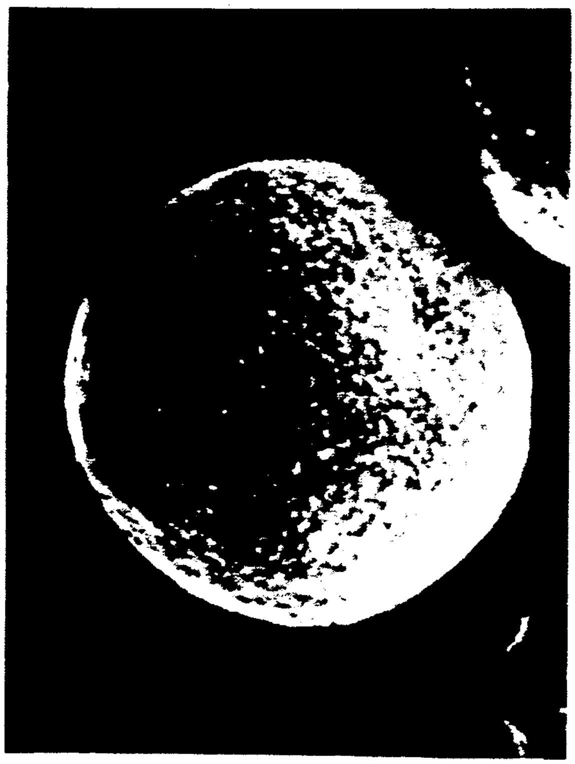
FIG. 1 is an electron photography showing the particle structure of a resin-coated carrier according to the invention.

The magnetic carrier of the present invention should have a resin coating formed on the respective magnetic particles and made of a combination of an alkylated melamine resin and acryl-modified silicone resin wherein the alkylated melamine resin should have a molecular weight satisfying the afore-mentioned inequality (1) which is a function of the number of carbon atoms in the alkyl moiety or group.

The resin coating of the magnetic carrier is essentially made of thermosetting resins from the standpoints of wear resistance, hardness, non-adhesiveness, heat resistance and durability. In view of the film forming properties and reactivity for curing, it is beneficial to use two or more resin ingredients which are able to react with each other thereby forming a three dimensional structure.

One of the curable resin ingredients chosen in the practice of the invention is an alkylated melamine resin. The reasons why this resin is selected are as follows: the resin has a number of amino groups in the molecule and exhibits positive chargeability relative to the magnetic carrier; it has a good curing action on other resins due to the presence of the alkylated methylol groups or methylol groups; and it is capable of forming a dense hard resin film by curing. The use of the alkylated melamine resin is due to the reason that the alkylation (etherification) of the methylol group lowers the melting point and improves the solubility in solvent along with improved compatibility with other resins and improved film forming properties and curability.

As the other curable resin ingredient, there is selected an acryl-modified silicone resin. The silicone resin-containing film exhibits good water repellency and moisture resistance and has such a small friction coefficient that the carrier can be prevented from being spent. However, it has been found that when a composition containing a non-modified silicone resin is coated on the surface of the magnetic particles, it becomes difficult to increase the density of an image obtained with the two-component developers using the coated magnetic carrier. The use of silicone resins modified with an acrylic resin as a coating results in increasing the density of an image obtained upon development without a substantial sacrifice of the moisture resistance and the "spent" preventing property inherent to the silicone resin. In addition, the compatibility with the alkylated melamine resin and the reactivity for curing are improved, making it possible to form a coating on the surface of magnetic particles which has good durability and good other characteristic properties.

In the practice of the invention, it is very important to use the alkylated melamine resin whose molecular weight satisfies the afore-mentioned inequality (1), preferably the following inequality (1'):

$$M \geqq 1100C-450 \qquad (1')$$

wherein M and C have, respectively, the same meanings as defined before. As a result, a smooth and uniform resin coating layer can be formed without irregularity thereon.

Figure 2:
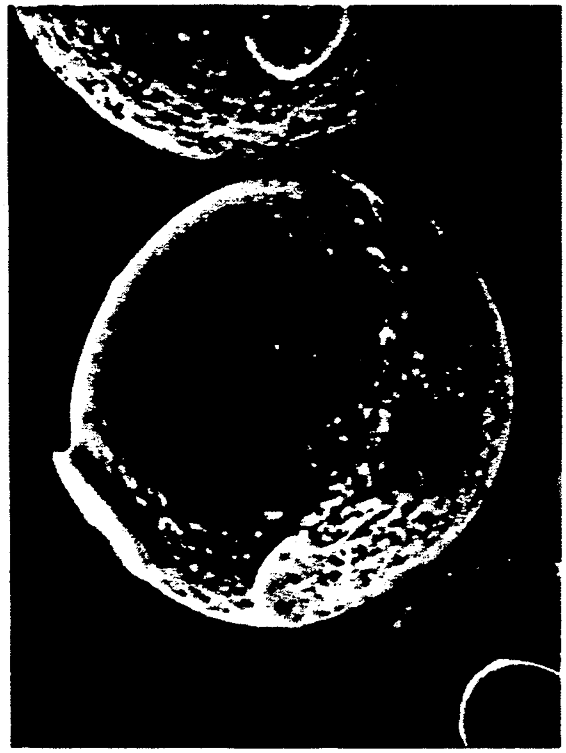
FIG. 2 is an electron photography showing the particle structure of a known resin-coated carrier.

FIG. 1 is a photograph by a scanning electron microscope which shows the particle structure of a magnetic carrier obtained by coating an alkylated melamine-acryl-modified silicone resin on sintered ferrite spherical particles according to the invention (obtained in example appearing hereinafter). Likewise, FIG. 2 is a photograph by a scanning electron microscope of the particle structure of a resin-coated magnetic carrier using ordinarily employed low molecular weight alkylated melamine and acryl-modified silicone resin. From these two photographs, it is understood that the coated magnetic carrier particles using the ordinary alkylated melamine resin inevitably involve formation of crater-shaped irregular surfaces, whereas the use of a high molecular weight alkylated melamine resin according to the present invention can prevent formation of the irregularities on the surface of the coated magnetic carrier with the surface being smooth and uniform. As will be described in examples according to the invention, the amount of spent carrier is markedly reduced to the half over that in the case of the prior art carrier.

Figure 3:
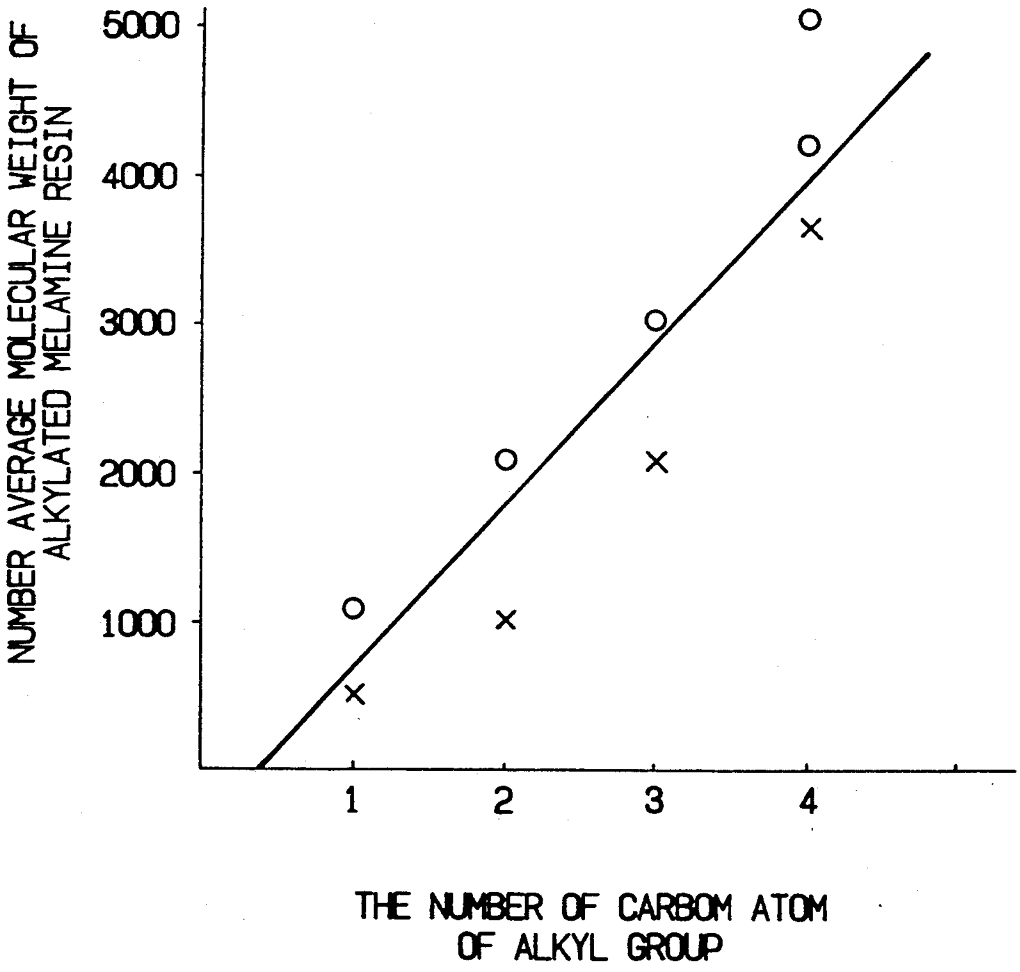
FIG. 3 is a graph showing the relation between the weight average molecular weight of an alkylated melamine resin and the number of carbon atoms in the alkyl moiety in the resin in order to evaluate the particle structure with regard to the above relation.

The present inventors have experimentally found a fact that the critical molecular weight of the alkylated melamine resin which can prevent irregularities from being formed on the surface of carrier or can prevent the magnetic particles from being deposited and coagulated depends on the number of carbon atoms in the alkyl moiety of the alkylated melamine resin. FIG. 3 is a graphical representation of the experimental results, wherein the weight average molecular weight (M) is taken as the ordinate axis and the number of carbon atoms in the alkyl moiety (C) is taken as the abscissa axis and the occurrence of irregularities in the case of FIG. 2 is plotted as "x" and formation of a smooth surface in the case of FIG. 1 is plotted as "o". From the results shown in FIG. 3, it is understood that the use of the resin having a molecular weight satisfying the inequality (1), preferably the inequality (1') can prevent formation of the irregularities, thereby providing a smooth resin coating.

As stated before, the formation of the irregularities in the resin coating layer is ascribed to melt adhesion of the resin layers formed on the respective magnetic particles. In the present invention, the melt adhesion of the resin layers can be prevented by controlling the molecular weight of the alkylated melamine resin at a certain level or over while depending on the number of carbon atoms in the alkyl moiety.

The alkylated melamine resin useful in the present invention is obtained by addition reaction between a melamine or a melamine derivative such as benzoguanamine, acetoguanamine or the like (hereinafter collectively referred to as "melamine compounds") and formaldehyde and successive reaction between the resultant methylol product and an alcohol to etherify (alkylate) at least a part of the methylol groups.

The quantitative ratio between the melamine compound and the formaldehyde in the above addition reaction, it should be properly determined having due regard for the kind of the melamine compound to be used since melamine has three amino groups and guanamine has two amino groups. However, in general, the quantity of the formaldehyde to be used is preferably in the range of from 1.0 to 8.0 moles or more preferably, in the range of from 2.0 to 7.0 moles respectively versus one mole of the melamine compound. The methylolation or hydroxymethylation reaction is effected in the presence of an alkaline catalyst such as a hydroxide of an alkali metal or an alkaline earth metal. During the reaction, the methylolated melamine is self-condensed or is self-bonded through the methylene groups thereof to increase the molecular weight. If alcohols are present in the reaction medium, the methylol group and the alcohol are condensed by etherification.

Examples of the alcohol include methanol, ethanol, n or iso-propanol, n or iso-butanol and the like. By this, an alkyl group having a desired number of carbon atoms can be introduced. The degree of the alkylation (etherification) is preferably in the range of from 10 to 85%, more preferably, of from 20 to 80%.

The acryl-modified silicone resins include block or graft copolymers of acryl-silicones, and blends of the copolymers with acrylic resins and/or silicone resins. Examples of the silicone resin ingredient are those which consist of organopolysiloxane units such as dimethylpolysiloxane, dephenylpolysiloxane, methylphenylpolysiloxane and the like and reactive groups at ends of the molecule or in the molocule chain, such as a hydroxyl group, a mono, di or tri-alkoxysilyl group or alkoxysiloxane group, a vinylorganosilyl group or a vinylorganosiloxy group.

The acrylic resin ingredients include, for example, those copolymers which are composed of a major proportion of (meth)acrylic ester units such as methyl (meth)acrylate, ethyl (meth)acrylate, propyl (metho)acrylate, butyl (meth)acrylate, 2-hydroxyethyl (meth)acrylate, 3-hydroxypropyl (meth)acrylate, 2-aminoethyl (meth)acrylate, N-ethyl-2-aminoethyl (meth)acrylate, and the like, and a minor proportion of ethylenically unsaturated monomer units having an alkoxysilyl group. Examples of the monomer having an alkoxysilyl group include vinyltriethoxysilane, 3-triethoxysilylpropyl (meth)acrylate and the like.

When these silicone resin ingredients and acrylic resin ingredients are reacted, the silicone resins are modified through the reaction between the functional groups in the silicone resin and the functional groups of the acrylic resin.

The acryl-modified silicone resin used in the present invention should have a ratio by weight between the acrylic resin ingredient and the silicone resin ingredient preferably in the range of from 80:20 to 20:80, or more preferably in the range of from 70:30 to 30:70. This modified resin should have a reactive group capable of reacting with the methylol group (etherified methylol group), which is preferably a hydroxyl group, an alkoxy group or the like. The concentration of the reactive group is preferably in the range of from 1 to 400 mmols/100 g of the resin and more preferably, in the range of from 3 to 200 mmols/100 g of the resin.

The curable resin composition used in the present invention may contain an arbitrary ratio of the alkylated melamine resin and the acryl-modified silicon resin. The ratio by weight between the alkylated melamine resin and the acryl-modified silicone resin is preferably in the range of from 1:99 to 30:70, or more preferably, in the range of from 5:95 to 50:50. If the ratio of the alkylated melamine resin is smaller than the above range, chargeability and smooth coat forming properties will become unsatisfactory. On the other hand, when the ratio of the acryl-modified silicone resin is smaller than the above range, the moisture resistance and the spent-preventing properties are lowered.

The magnetic particles used in the present invention are sintered ferrite particles or iron powder.

The ferrite particles should be substantially spherical in shape and have a median particle size of from 35 to 150 μm, preferably from 40 to 120 μm. The ferrite composition may be any composition known in the art and so-called soft ferrites, but not critical, are mentioned, including Zn ferrites, Ni ferrites, Cu ferrites, Mn ferrites, Mn-Zn ferrites, Mn-Mg ferrites, Cu-Zn ferrites, Ni-Zn ferrites, Mn-Cu-Zn ferrites and the like. Preferable ferrites are Cu-Zn ferrites or Cu-Zn-Mn ferrites comprised, by atomic percent, of 35 to 65% of Fe, 5 to 15% of Cu, 5 to 15% of Zn, and 0 to 0.5% of Mn.

These ferrites have generally a fine primary particle size of from 0.5 to 7 μm and are granulated substantially in the form of spheres by means of spray granulation and sintered.

The ferrite carrier may have either a high resistance or a low resistance. In general, those ferrites have a volume resistivity of $6\times10^4$ to $2\times10^7$ Ω·cm, preferably from $2.5\times10^5$ to $1.5\times10^7$ Ω·cm.

On the other hand, the iron powder carrier may be any iron powder carriers known in the art and should preferably have a size of from 20 to 150 micrometers. The iron powder for magnetic carrier is generally prepared by a procedure which includes subjecting scrap soft steel to primary crushing, oil baking and concentration steps, after which it is nitrided to form brittle primary particles. The particles are milled to obtain final particles, followed by de-nitrification and final oxidation treatment on the surface.

The resin coating on the magnetic particles is carried out by spraying a solution of the afore-described resin composition over magnetic particles on a fluidized bed. The coating composition may contain the resin components in an amount of from 0.1 to 40 wt %, preferably from 1 to 20 wt %, dissolved in a solvent such as toluene, xylene or the like. The composition is applied onto the magnetic particles in a resin-deposited amount of from 0.01 to 10 wt %, preferably from 0.05 to 5 wt %. In the fluidized bed, the resin components are deposited as coating the surface of the respective magnetic particles and the solvent starts to evaporate. With the resin composition in the present invention, little or no coagulation by adhesion of the resin coating layers takes place. The resin-coated magnetic particles are heated, for example, to a temperature of from 100° to 250° C. to cure the resin coating. As a matter of course, curing may be effected at lower temperature or at room temperature by using a silanol condensation catalyst or other curing catalyst contained in the coating. The electric resistance of the coated carrier should favorably be in the range of $1\times10^8$ to $1\times10^{13}$ Ω·cm, more preferably $1\times10^9$ to $1\times10^{12}$ Ω·cm.

According to the present invention, a heat curable resin composition comprised of an alkylated melamine resin having a certain molecular weight depending on the number of carbon atoms in the alkyl moiety and an acryl-modified silicone resin is used to coat the surface of individual magnetic particles, by which the resin coating layers are prevented from mutual melt adhesion to provide a smooth and uniform resin coating which is free of any irregularity. Accordingly, the resin-coated magnetic carrier suffers little spent phenomenon with good durability, moisture resistance and chargeability.

DESCRIPTION OF THE PREFERRED EMBODIMENT

The present invention is described in more detail by way of examples, which should not be construed as limiting the present invention. Comparative examples are also described.

Resin-coated carriers using different types of alkylated melamine resins were made in the following manner. There was provided a non-coated ferrite carrier, DFC-150 (commercial name of Douwa Iron Powder Co., Ltd.) made of spherical ferrite particles having an average size of 80 μm. On the other hand, fundamental compositions which were comprised of 7 g of acryl-modified silicone, KR9706 (commercial name of Shin-Etsu Chem. Ind. C., Ltd.), 3 g of various alkylated melamine resins having different numbers of carbon atoms (indicated in Examples and Comparative Examples in Table 1) and different molecular weights, and 500 g of toluene, each per 1000 g of the ferrite carrier, were also provided. Each composition was sprayed over the ferrite carrier by means of a fluidized bed coating apparatus to coat the carrier with the composition, followed by heating at 150° C. for curing the coated resin. Thus, resin-coated carriers using different types of alkylated melamine resins were prepared.

Separately, a toner composition was provided which was obtained by granulating by a usual manner 100 parts by weight of a styrene-acrylic copolymer, 7 parts by weight of carbon black as a colorant, 1 part by weight of a negatively charging dye as a charge controlling agent and 1.5 parts by weight of low molecular weight polypropylene as an offset inhibitor to obtain a powder toner having an average size of 11 μm, and adding 0.2 parts by weight of a hydrophobic silica surface treating agent to 100 parts by weight of the powder toner. The toner composition and the resin-coated carrier were mixed at a ratio by weight of 3.5:96.5 to obtain a developer. The resultant developers were subjected to a copying test of 20000 copies by the use of a reconstructed machine of Electrophotographic Duplicator DC-5585 (commercial name of Mita Ind. Co., Ltd.) under conditions of a normal temperature and a normal humidity (20° C., 60%) and a high temperature and a high humidity (35° C., 85%).

The results are shown in Table 1 (20° C., 60%) and Table 2 (35° C., 85%).

The amount of spent carrier in the tables was determined as follows: the toner was separated by suction from the developer after the copying test and the content of the toner deposited on the carrier surface was measured by means of a carbon analyzer; and the amount was expressed in terms of wt % based on the carrier prior to the copying test.

As will be apparent from the results shown in Tables 1 and 2, it is understood that the carriers according to the present invention have a significantly reduced amount of spent carrier, provide stable charge characteristics and stably and repeatedly a high quality image with a desired density; and the deterioration of these characteristics is little upon varying environmental conditions.

wherein M represents a weight average molecular weight of the resin and C represents the number of carbon atoms in the alkyl moiety, and an acryl-modified silicone resin.

2. A resin-coated magnetic carrier according to claim 1, wherein the alkyl moiety has from 1 to 4 carbon atoms.

3. A resin-coated magnetic carrier according to claim 1, wherein a degree of alkylation in the alkylated melamine is in the range of from 10 to 85%.

4. A resin-coated magnetic carrier according to claim 1, wherein a ratio by weight of the alkylated melamine resin and the acryl-modified silicone resin is in the range of 1:99 to 30:70.

5. A resin-coated magnetic carrier according to claim 1, wherein the acryl-modified silicone resin is a reaction product between an acrylic resin and a silicone resin at a ratio by weight of 80:20 to 20:80.

6. A resin-coated magnetic carrier according to claim 5, wherein the acryl-modified silicone resin has a group reactive with methylol group at a concentration of from 1 to 400 mmols/g of the resin.

7. A resin-coated magnetic carrier according to claim 1, wherein the magnetic particles have a median particle size of from 35 to 150 μm.

8. A resin-coated magnetic carrier according to claim 1, wherein the resin composition is deposited in an amount of from 0.01 to 10 wt % based on the magnetic particles.

* * * * *

TABLE 1

(20° C., 60%)

| | Number of Carbon Atoms in Alkyl Group | Molecular Weight of Alkylated Melamine Resin | State of Coating | Amount of Spent Carrier (%) | Image Density (Optical Density) Initial | Image Density (Optical Density) After 20000 copies | Fogging Density Initial | Fogging Density After 20000 copies | Amount of Toner Charge (μc/g) Initial | Amount of Toner Charge (μc/g) After 20000 copies |
|---|---|---|---|---|---|---|---|---|---|---|
| Example 1 | 1 | 1100 | O | 0.21 | 1.45 | 1.48 | 0.001 | 0.008 | 20.8 | 21.2 |
| Comparative Example 1 | 1 | 600 | X | 0.52 | 1.46 | 1.47 | 0.002 | 0.015 | 21.3 | 22.8 |
| Example 2 | 2 | 2100 | O | 0.23 | 1.44 | 1.43 | 0.001 | 0.002 | 19.6 | 20.9 |
| Comparative Example 2 | 2 | 1000 | X | 0.51 | 1.46 | 1.45 | 0.002 | 0.011 | 19.8 | 22.0 |
| Example 3 | 3 | 2900 | O | 0.21 | 1.44 | 1.46 | 0.001 | 0.001 | 19.9 | 20.3 |
| Comparative Example 3 | 3 | 2000 | X | 0.62 | 1.45 | 1.42 | 0.003 | 0.008 | 21.2 | 18.8 |
| Example 4 | 4 | 5000 | O | 0.19 | 1.46 | 1.47 | 0.001 | 0.002 | 20.3 | 20.6 |
| Example 5 | 4 | 4100 | O | 0.22 | 1.44 | 1.47 | 0.001 | 0.001 | 21.3 | 21.1 |
| Comparative Example 4 | 4 | 3500 | X | 0.54 | 1.42 | 1.43 | 0.003 | 0.016 | 19.6 | 17.8 |

TABLE 2

(35° C., 85%)

| | Number of Carbon Atoms in Alkyl Group | Molecular Weight of Alkylated Melamine Resin | State of Coating | Amount of Spent Carrier (%) | Image Density (Optical Density) Initial | Image Density (Optical Density) After 20000 copies | Fogging Density Initial | Fogging Density After 20000 copies | Amount of Toner Charge (μc/g) Initial | Amount of Toner Charge (μc/g) After 20000 copies |
|---|---|---|---|---|---|---|---|---|---|---|
| Example 1 | 1 | 1100 | O | 0.23 | 1.43 | 1.39 | 0.001 | 0.003 | 21.2 | 22.0 |
| Comparative Example 1 | 1 | 600 | X | 0.64 | 1.42 | 1.28 | 0.002 | 0.019 | 20.9 | 18.4 |
| Example 2 | 2 | 2100 | O | 0.22 | 1.42 | 1.44 | 0.002 | 0.003 | 19.9 | 20.2 |
| Comparative Example 2 | 2 | 1000 | X | 0.59 | 1.39 | 1.19 | 0.005 | 0.020 | 18.5 | 17.1 |
| Example 3 | 3 | 2900 | O | 0.19 | 1.40 | 1.42 | 0.002 | 0.003 | 20.3 | 20.7 |
| Comparative Example 3 | 3 | 2000 | X | 0.69 | 1.42 | 1.32 | 0.002 | 0.018 | 19.9 | 17.9 |
| Example 4 | 4 | 5000 | O | 0.21 | 1.44 | 1.42 | 0.003 | 0.004 | 21.2 | 21.9 |
| Example 5 | 4 | 4100 | O | 0.24 | 1.41 | 1.42 | 0.002 | 0.003 | 20.4 | 20.2 |
| Comparative Example 4 | 4 | 3500 | X | 0.72 | 1.38 | 1.22 | 0.003 | 0.025 | 19.8 | 17.2 |

What is claimed is:

1. A resin-coated magnetic carrier for two-component developer which comprises magnetic particles and a resin coating formed on the surface of individual magnetic particles, the resin coating being made of a cured resin composition which comprises an alkylated melamine resin having a molecular weight satisfying the following inequality $$M \geqq 1100C - 400$$